United States Patent
Smith, Jr. et al.

(10) Patent No.: US 6,690,369 B1
(45) Date of Patent: *Feb. 10, 2004

(54) HARDWARE-ACCELERATED PHOTOREAL RENDERING

(75) Inventors: George Randolph Smith, Jr., Madison, AL (US); Karin P. Smith, Madison, AL (US); David John Stradley, Madison, AL (US)

(73) Assignee: 3DLabs, Inc., Ltd., Hamilton (BM)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,715

(22) Filed: Aug. 1, 1997

Related U.S. Application Data
(60) Provisional application No. 60/023,795, filed on Aug. 1, 1996, and provisional application No. 60/023,513, filed on Aug. 7, 1996.

(51) Int. Cl.[7] ............................................. G06T 15/00
(52) U.S. Cl. ...................................................... 345/419
(58) Field of Search ................................ 345/119, 118, 345/426, 429, 419, 428, 619

(56) References Cited

U.S. PATENT DOCUMENTS 5,371,514 A * 12/1994 Lawless et al. ............. 345/421
5,408,605 A * 4/1995 Deering ....................... 345/501

OTHER PUBLICATIONS

Newman et al. Principles of Interactive Computer Graphics—Second Edition. "Chapter 25 Shading". Pp 389–410. McGraw–Hill Book Company. New York. 1979.*

3D Studio Max User's Guide, vol. 1. Kinetix, Inc. ISBN No. 12801–000000–5020, Mar. 1999.*

* cited by examiner

Primary Examiner—Phu K. Nguyen
(74) Attorney, Agent, or Firm—Arnall Golden Gregory LLP

(57) ABSTRACT

A multiple-pass system for determining the primitives that are visible in a predetermined pick aperture for a "visible pick" operation. On the first pass, the primitives contained within the pick aperture and thus potentially visible are selected, and each selected primitive is assigned a pick index as an identifier. On the second pass, the pick indices of the selected primitives are rendered to a temporary frame buffer area, using a Z-buffer for hidden surface removal so that only the pick indices of the primitives visible within the pick aperture are stored in the corresponding frame buffer portion. On the third pass, the frame buffer portion corresponding to the pick aperture is read to determine the pick indices of the visible primitives. This information is then used to report back to the host the picked primitives.

5 Claims, 8 Drawing Sheets

(a) Compute the normals for the faces (b) Compute the normals for the vertices (a) Real distortions in a physical surface (b) Pertubing normals give similar effect (a) 2D Texture (b) Procedural 3D Texture

HARDWARE-ACCELERATED PHOTOREAL RENDERING

RELATED APPLICATIONS

This application claims priority from provisional application serial No. 60/023,795, filed Aug. 1, 1996, and from provisional application serial No. 60/023,513, filed Aug. 7, 1996, these related applications are hereby incorporated herein by reference.

TECHNICAL FIELD

The present invention pertains to hardware-accelerated computer processing of multidimensional data, and, particularly, to systems for the creation and display of photoreal interactive graphics.

BACKGROUND OF THE INVENTION

The rendering of graphical images is an application of digital signal processing which requires intensive computation at multiple levels of the process. The typical three-dimensional graphics workstation architecture consists of multiple subsystems that are allocated functions uniquely. General purpose computers are typically used for non-display rendering of three-dimensional models into human viewable images. The non-display rendering process entails representation of the scene as a set of polygons, to which attributes such as texture and shadowing are applied through computation.

By applying some specialized architectural components of the three-dimensional graphics workstation, the non-display rendering process can be accelerated. In the state-of-the-art graphics workstation, each sub-system is used for a different part of the processing. The CPU/Main memory is used for general algorithmic processing, and temporary storage of data. Peripheral devices are used to allow human interaction with the workstation, to transmit and to permanently store digital information.

One such sub-system is the graphics display accelerator, typically used to take geometric shapes, mathematically place them in three-dimensional mathematical space, associate simulated lighting and optical effects, and produce an electronic picture in a frame buffer for visible display using a two-dimensional display component.

In this conventional architecture, the graphics display accelerator is a one-way state machine pipeline processor with low volume, highly abstracted data flowing in, and low level information displayed on the workstation monitor. The operation of the graphics display accelerator in the conventional architecture can be understood in the context of rendering processes.

One such rendering process is referred to as ray tracing (or ray casting) an image to be displayed. The ray trace rendering process consists of defining a series of polygons (typically triangles), at least one viewport or window through which the human views the simulated scene, and various light sources and other optical materials in a mathematical three-dimensional space. A viewer eye location is selected and a window on an arbitrary view plane are selected. The window is considered to be comprised of small image elements (pixels) arranged into a grid at a desired output resolution. Often the window is chosen to correspond to the display monitor at a given resolution, and the eye location is chosen to be at some location outside the screen to approximate where a human observer's eye may actually be located. Then, for each pixel of the window, a ray is fired from the eye location, through the pixel, and into the scene; the pixel is then colored (and assigned other attributes) based upon the intersection of the ray with objects and light sources within the scene. The ray, in effect, bounces around the objects within the scene, and surface and optical effectors modify the simulated light rays, and alter the eventual characteristics of the display pixel. More information regarding ray tracing may be found in *Computer Graphics, Principles and Practice*, 2d Ed. in C, by Foley, van Dam, et al, Addison-Wesley publ. (1996); this reference is hereby incorporated herein by reference.

To reduce the amount of processing necessary, frequently software "Z-Buffers" are used to spatially sort the polygons and to reduce the processing of un-necessary (non-visible) polygons. If a polygon is obscured by another polygon, the ray is not processed. However, because ray tracing is so computationally expensive, even in a high-performance three-dimensional workstation, the graphics display accelerator frequently uses a simpler type of rendering. Such accelerators commonly provide special purpose hardware components that provide Z-Buffer sorting, a stencil buffer, texture processing and geometry (vertex coordinate) transformation calculation.

Using a typical graphic display accelerator generally consists of loading each polygon into local memory on the graphic display adapter, projecting the three-dimensional coordinates onto the viewport two-dimensional coordinate system, tri-linearly interpolating (with perspective correction) any surface color and optional texture pattern. Current state-of-the-art rendering employs a high-performance three-dimensional graphics library such as, for example, OpenGL, that is supported by numerous hardware and software vendors. OpenGL significantly speeds the process of preview rendering, but it has some limitations. These limitations include its inability to directly support Phong shading and bump maps, graphics effects which provide more realistic images than simple Gouraud shading, which is supported by OpenGL.

SUMMARY OF THE INVENTION

In a preferred embodiment there is provided a rendering apparatus for providing, with respect to a defined viewer location and a defined viewport, a desired rendering of objects defined by object data having an object data format, in a three-dimensional object space. The apparatus in this embodiment has a graphics accelerator for transforming object data into image data determined with respect to the defined viewer location and the defined viewport, and a rendering processor for converting at least one parameter characterizing the desired rendering into parameter data in object data format, feeding the parameter data to the graphics accelerator, and converting resulting image data as to the at least one parameter to a further processed result pertinent to the desired rendering.

In a further embodiment, the apparatus has an intermediate memory in which is stored the image data from the graphics accelerator, wherein the rendering processor converts the image data stored within the intermediate memory into the further processed result. The image data may be defined by values associated with a plurality of pixel locations in an image. In a further embodiment, the rendering processor, before feeding the object data to the graphics accelerator, utilizes a tag assigned to each of the objects, so as to associate by tag pixel locations in the image with objects. Each of the objects has a surface that may be represented by a plurality of primitive polygons, and the rendering processor, before feeding the to object data to the graphics accelerator, may utilize a tag assigned to the primitive polygons, so as to associate by tag pixel locations with primitive polygons. The tag may be a color. The rendering processor, as part of converting resulting image data, identifies by tag the portions of object surfaces present in the image, and restricts further processing associated with the desired rendering to such portions so as to reduce processing overhead associated with the desired rendering. Related methods are provided.

In a further embodiment, there is provided a graphics rendering program stored on a computer readable medium for providing a desired rendering of objects defined by object data having an object data format, in a three-dimensional object space. The program is configured so as to be executable by a computer having a two-dimensional graphics accelerator for transforming object data into image data determined with respect to a defined viewer location and a defined viewport. When loaded into the computer, the program causes the establishment of a rendering apparatus having a graphics accelerator for transforming object data into image data determined with respect to the defined viewer location and the defined viewport, and a rendering processor for converting at least one parameter characterizing the desired rendering into object data format, feeding the object data to the graphics accelerator, and converting resulting image data to a further processed result pertinent to the desired rendering.

The computer further includes an intermediate memory in which the rendering program causes to be stored the image data from the graphics accelerator, and wherein the rendering processor converts the image data stored within the intermediate memory into the further processed result.

BRIEF DESCRIPTION OF THE DRAWINGS

The invention will be more readily understood by reference to the following description, taken with the accompanying drawings, in which.

DETAILED DESCRIPTION OF THE PREFERRED EMBODIMENT

Figure 1:
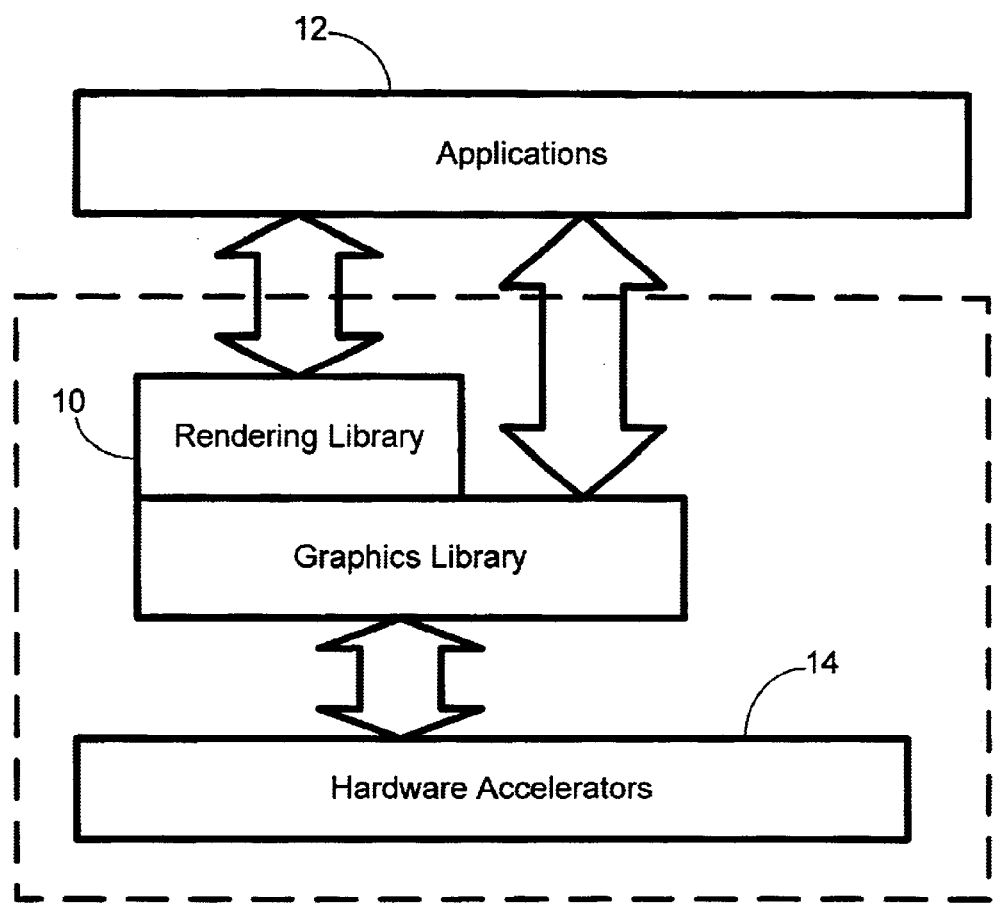
FIG. 1 is a block diagram of the rendering graphics architecture with an open application programming interface, in accordance with the present invention.
Figure 2:
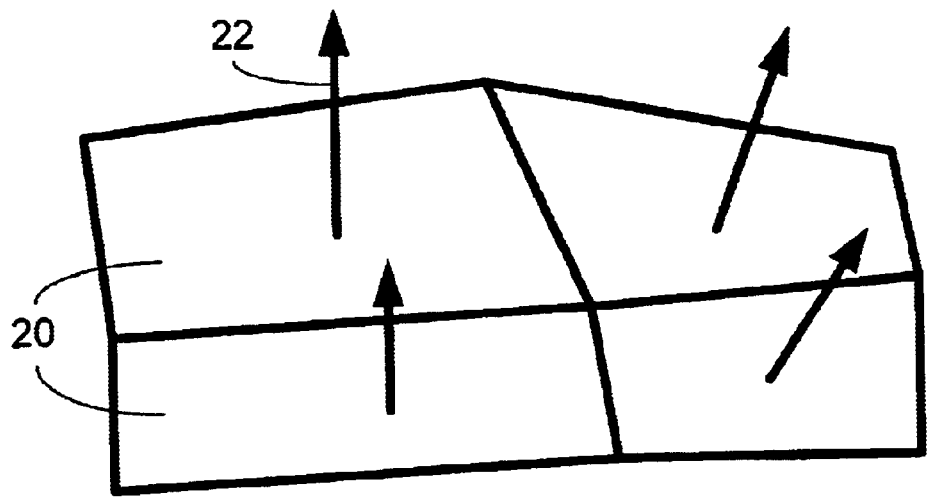
FIGS. 2a and 2b illustrate the process of computing normals to polygon vertices of a surface to enable Gouraud shading of the surface.
Figure 2:
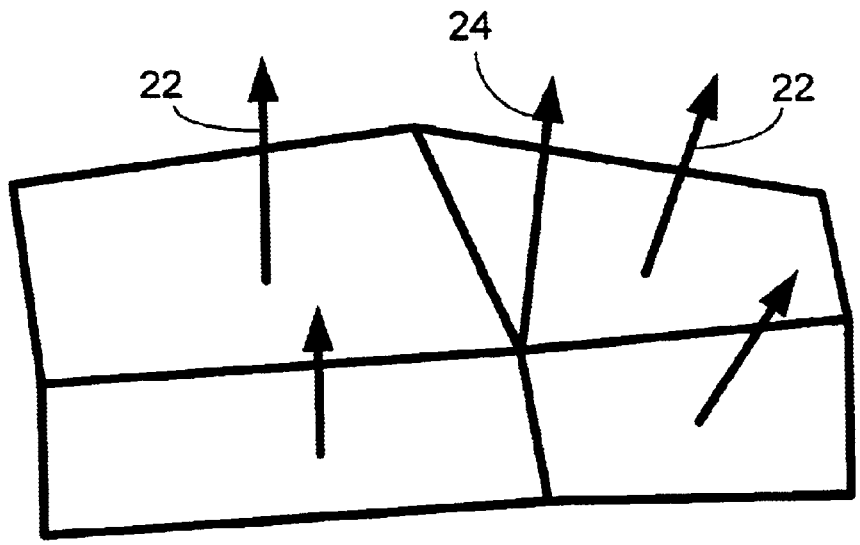
Figure 3:
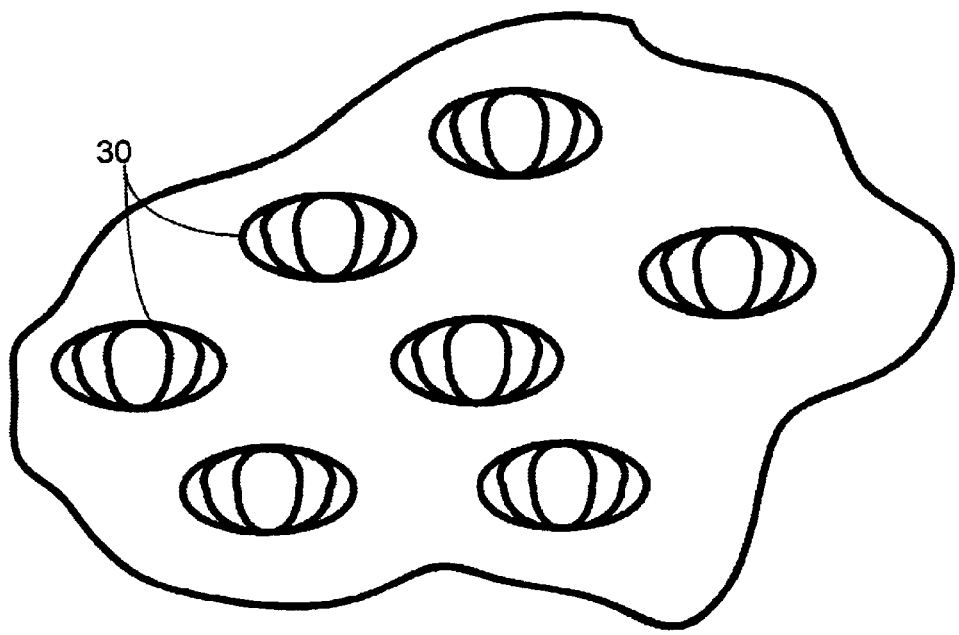
FIGS. 3a and 3b illustrate the process of perturbing surface normals to replicate the effect of surface texture, in accordance with the present invention.
Figure 3:
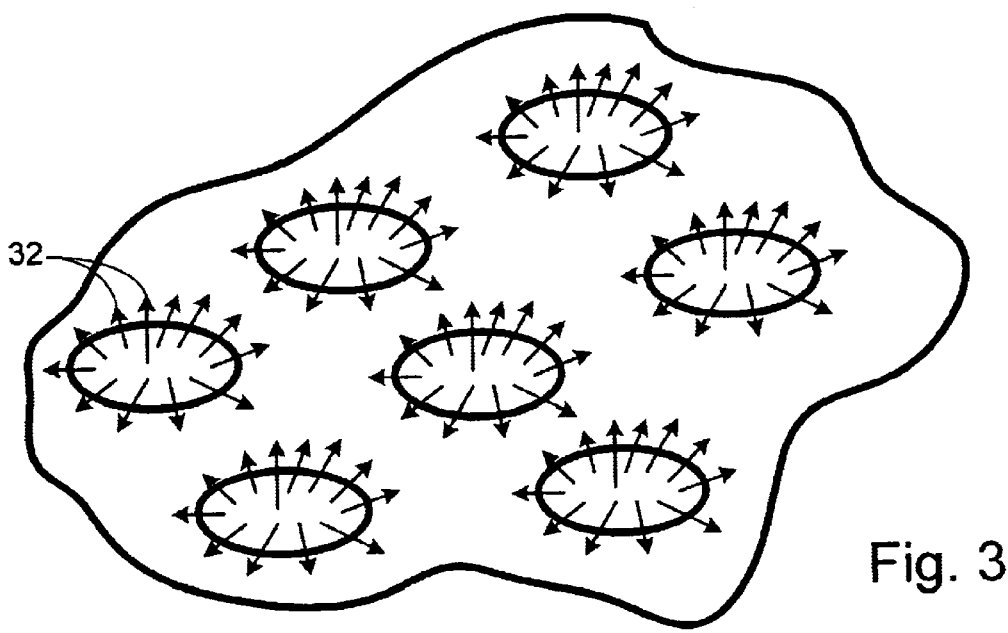

Described now, with reference to FIG. 1, is the preferred embodiment of a novel workstation architecture employing rendering software 10. The rendering software is employed on a graphics workstation, designated generally by numeral 12. Many applications exist where the apparatus and methods taught by this invention are advantageously applied. In the preferred embodiment, the application is to the near real-time processing of three-dimensional graphics, and the discussion is cast in graphics processing terms. It is to be understood, however, that the term "scene data," as used in this description and the appended claims, includes all multidimensional data structures which are advantageously operated upon in a highly parallel mode which treats elements, referred to as "pixels," of the processed data structure in a parallel manner. By casting the scene data of a digital signal processing problem in terms of graphics constructs, the high speed performance of a dedicated graphics display accelerator 14 can be applied to parallel processing problems otherwise requiring intensive computational resources. Similarly, as used in this description of the invention and in the appended claims, the term "image data" refers to the processed product of the scene data, after application, singly or recursively, of dedicated graphics display accelerator 14.

Graphics rendering software 10 is the first step toward the goal of Real Time Reality on the desktop (i.e. the ability to render photorealistic images in real-time or near real-time). For example, the rendering of "Toy Story" required a few hundred proprietary RISC/UNIX computers working 24 hours a day for a couple of years. In the future, the present invention will allow creative and technical professionals to render the same number of frames in a fraction of that time.

High speed performance in high-quality rendering is achieved by using graphics display accelerator 14 in a novel way. Instead of a one-way pipeline process that ends in the human visible display of a simulated three-dimensional space, display graphics accelerator 14 is now used to produce intermediate results, where these results may be utilized in a general purpose ray trace rendering algorithm, or other graphics algorithm. Such intermediate results are used to determine polygonal normals, texture coordinates for three-dimensional texture algorithms, local coordinates for two-dimensional surface texturing, bump map perturbations of the visible rays and to determine interpolated world coordinates of polygonal surfaces. The complete rendering process is now split amongst two of the major subsystems, the graphics display accelerator 14 (or hardware accelerator) and the CPU/Main Memory subsystem, thus improving performance of the rendering process on the three dimensional graphics workstation over that of a general purpose computer. The rendering software includes a graphics library with an open application programming interface (API) which extends the capabilities of OpenGL, and accelerates the creation and display of photoreal interactive graphics. A sample API is provided in the related provisional application bearing serial No. 60/023,513, which is incorporated herein by reference.

By virtue of the acceleration of the rendering process, the graphics workstation is now able to produce higher quality graphics, incorporating features of photoreal, or production, rendering. For example, in the shading process described hereinbelow, normals may be interpolated pixel-by-pixel (Phong shading), to produce higher quality three-dimensional graphics than are available using Gouraud shading (provided by OpenGL), in which normals are computed for faces of polygons, and then averaged to derive values for polygon vertices. The graphics rendering subsystem (which includes the rendering library) dramatically accelerates graphics attributes, such as Gouraud shading, which are standard to the existing (such as OpenGL) high-performance three-dimensional graphics library. Additionally, the invention accelerates features that OpenGL does not support, such as Phong shading, bump maps. Shadows, and Procedural three-dimensional textures. Thus, for the first time, creative and technical professionals can perform fast preview rendering with richly textured high-quality images, rather than being constrained to simple Gouraud shading.

The additional attributes which can be applied to produce high-quality three-dimensional graphics can be appreciated by reference to FIGS. 2–5.

FIGS. 2a and 2b illustrate the process of computing normals to polygon vertices of a surface to enable Gouraud shading of the surface. Three-dimensional models are usually represented as a large collection of smaller polygons, typically triangles, and the quality of the final rendered image depends on the sophistication of the algorithms used to shade these polygons. Shown in FIG. 2(a) are the faces of several polygons 20, and an associated normal vector 22 which is used to indicate how light will be reflected by that polygon shown in FIG. 2b is the first step in the Gouraud shading process, which is to calculate the normals 24 for each of the polygon's vertices (corners) by averaging the normals 22 from the surrounding faces. The computed normals for the vertices are then used to determine the RGB (red, green, and blue) color components for the vertices as seen by an observing eye or camera. These RGB components are based on the color of the material combined with the effect of any light sources. Gouraud shading is based on calculating the color components of each of the pixels forming the polygon by linear interpolation of the RGB values at the vertices. Note that the use of the RGB color scheme is for exemplary purposes only, and another coloring scheme, such as CYMK (cyan, yellow, magenta, and black) may also be used.

Gouraud shading provides acceptable results, but the highest quality three-dimensional graphics demand something more. The problem is that Gouraud shading simply calculates the normals at the vertices and then interpolates the colors of the polygon's interior pixels. And, especially for curved polygons, the shading effect is not too realistic as the interpolation does not account for different normal values across the polygon surface. A solution to this problem (referenced herein as Phong shading) is to derive a normal for every interior pixel, and to then apply a given shading model to that individual pixel based on its normal component. However, although providing much superior results over Gouraud shading, this solution is computationally intensive as there may be many interior pixels (dependent upon display resolution) for each polygon. The present invention, by virtue of dramatically accelerated processing, makes practical the utilization of Phong shading on a graphics workstation.

FIGS. 3a and 3b illustrate the process of perturbing surface normals to replicate the effect of surface texture, in accordance with the present invention. Real-world objects are rarely geometrically smooth; instead, they often have distortions in their surfaces giving them a physical texture. Consider the surface of a strawberry, which is all one color, but whose dimples give it a rich physical texture. FIG. 3a shows one way to replicate this effect, where one explicitly creates geometrical distortions 30 into the model's surface. This solution, however, requires significant modeling effort and results in excessive amounts of computation. FIG. 3b shows an alternate solution, in which the surface normals 32 are perturbed, causing them to reflect the light so as to provide a similar effect. Generally, perturbing the surface normals requires the use of a bump map, which simulates the effect of displacing the points on the surface above or below their actual positions. Bump maps fully complement the process of Phong shading, in which individual normals have already been computed for each pixel on the surface; the bump map is used to modify these normals prior to the shading model being applied to each pixel.

Bump maps are distinct from the concept of texture (pattern) maps, in which an image is projected onto a surface. Texture maps range from flat images (such as geometric patterns) to actual photographs of rough surfaces. However, texture maps of rough surfaces don't look quite right, because they simply affect a surface's shading, and not its surface shape. They also tend to look incorrect because the direction of the light source used to create the texture map is typically different from the direction of the light illuminating the mapped three-dimensional object. That is, unless the light sources for the rough pattern are the same as the one within the three-dimensional object space, when viewing the texture mapped onto an object within the object space, one sees that something is wrong with the resultant image. Thus texture maps are not used for producing realistic output with OpenGL. Although bump maps provide superbly textured three-dimensional images, overcoming the visual lighting problems requires use of Phong shading, and such shading is not directly supported by OpenGL. Thus, in addition to accelerating the rendering process of standard OpenGL effects, the invention provides the ability to create images that are not possible with OpenGL alone.

Figure 4:
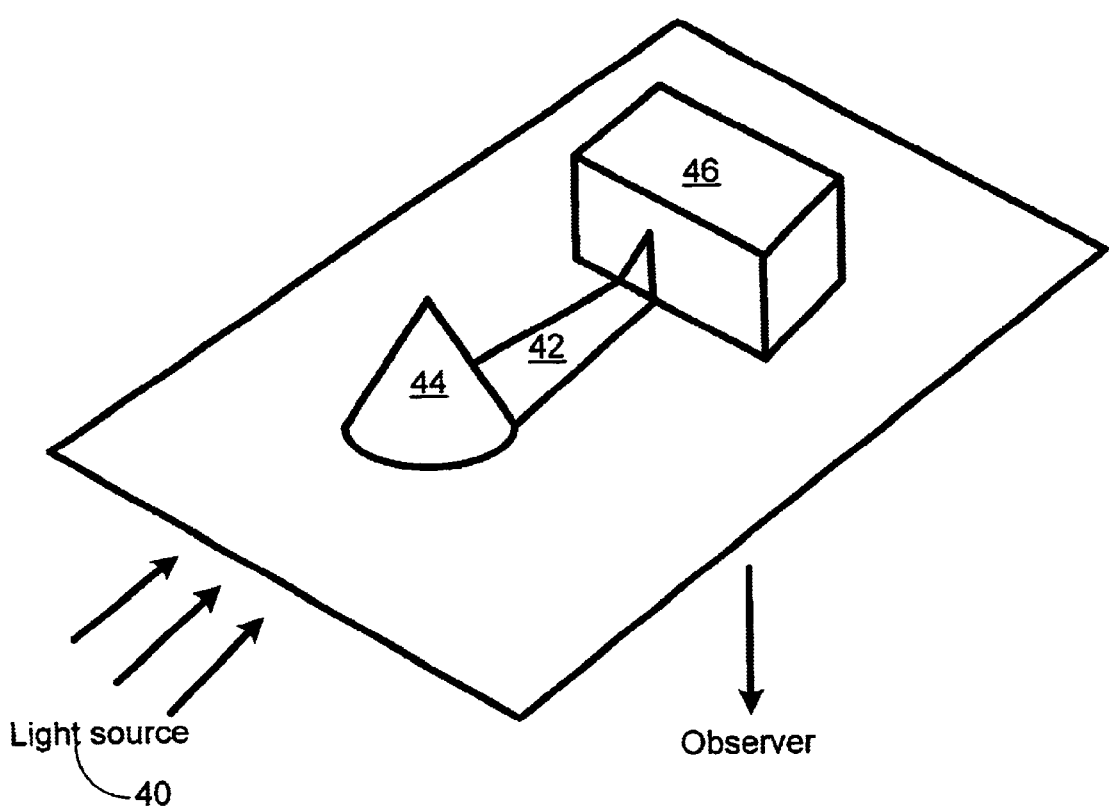
FIG. 4 illustrates the process of computing shadows.
Figure 5:
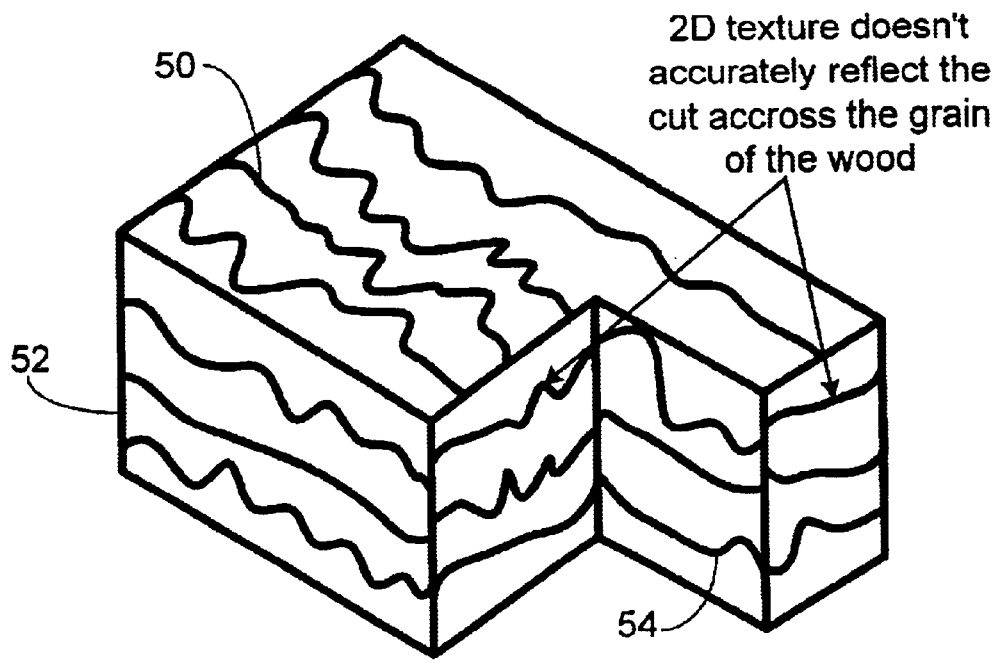
FIGS. 5a and 5b illustrate the process of computing procedural three-dimensional texture.
Figure 5:
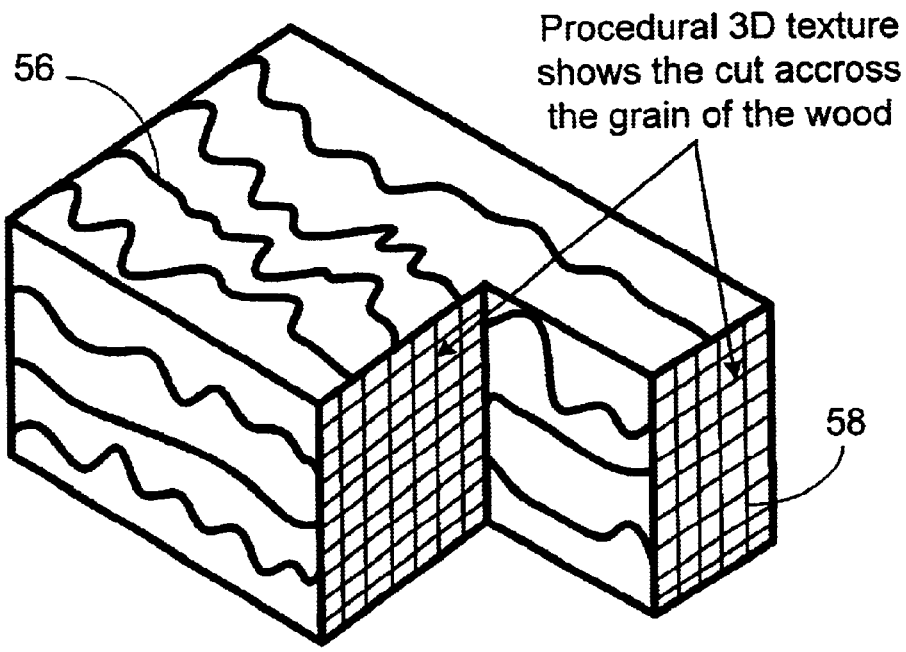

FIG. 4 shows a light source 40 causing a shadow 42 to be cast by a first object 44 onto a second object 46. An important component to realistic imaging is to ensure that objects within a given three-dimensional object space cast proper shadows. However, doing so greatly increases the amount of computation that needs to be performed. Creating shadows is computationally intensive because an area in shadow is rarely pure black. Instead, the area usually contains some amount of color content in a diminished form. A preferred embodiment provides special extensions for the acceleration of shadow creation.

FIGS. 5a and 5b illustrate the process of computing procedural three-dimensional texture, textures not directly supported by OpenGL. FIG. 5a shows that the application of flat, two-dimensional textures 50 to three-dimensional objects 52 usually results in unrealistic results, particularly when attempting to display a cross-sectional cut-away view 54 through an object. FIG. 5b shows, in contrast, that procedural three-dimensional textures 56 provide the ability to define a more realistic texture that occupies three dimensions and understands the geometry of the object in question. For example, when a procedural three-dimensional wood-grain 56 texture is applied to an object, then taking a cross-sectional view of the object reveals the grain 58 of the wood inside the object (or whatever else, such as a knot hole, that was defined to be within the texture). This provides for a more realistic image. In a preferred embodiment, the invention provides for accelerated generation and utilization of procedural three-dimensional textures.

Figure 6:
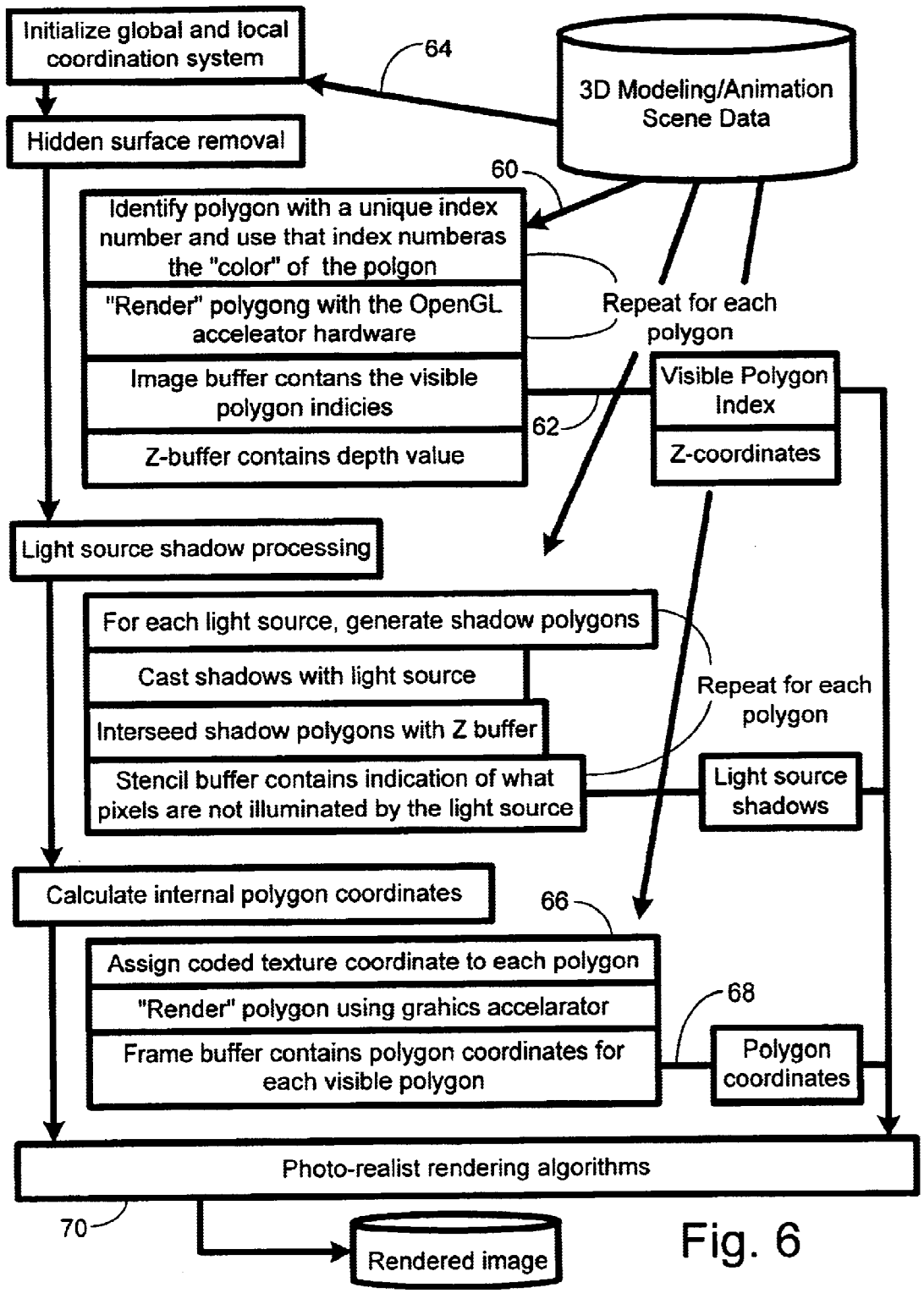
FIG. 6 is a flow diagram depicting the steps of image rendering in accordance with the present invention.

FIG. 6 shows a flow diagram depicting the steps of image rendering in accordance with the present invention. Unlike with a conventional graphics processing system, where a host computer is required to compute all graphics, Z-Buffer and stencil processing within its CPU and memory subsystem (a burden on the host), a preferred embodiment utilizes a graphics display adapter (preferably optimized for this task) to off-load such processing from the host computer so as to free the CPU and memory subsystem for other processing tasks. A preferred embodiment allows intermediate graphics processed images to be displayed and for successive attributes to be applied without reinitiating the entire rendering process.

In accordance with the invention, three dimensional-coded color data is written to the graphics accelerator (step 60) and polygon identification information is read back (step 62). By applying flat color shading information to each polygon as it is processed in the graphics display accelerator, each pixel in the output "image" from the graphics display accelerator uniquely identifies the front visible polygon at that position in the viewport.

The process consists of the steps of: establishing view parameters; artificially coding each polygon with a unique "color;" placing the polygon in the display space; "displaying" the view; and reading the resulting "image" which consists of coded polygon identifiers.

These pixel values are now the polygon identification codes and represent the identification of each front visible polygon from the viewport.

By applying coded vertex "color" values as each polygon is placed in the graphics display adapter, linear interpolated barycentric coordinates [u,v,w] can be determined (step 64) in the viewport two-dimensional coordinate system. These barycentric coordinates may then be used to calculate additional parameters during the rendering process including the direction of normal vectors, the three-dimensional texture coordinates, two-dimensional texture coordinates and the world coordinates of each pixel in the output image.

This process consists of: establishing view parameters; coding the "color" value of each vertex of the polygon; placing the polygon in the display space; "displaying" the view; and reading the resulting "image" which consists of the polygon barycentric coordinates.

This "image" is then used to directly identify the linear interpolated position of the pixel on the polygon. This linear interpolation value is then for example, applied to the normal vector direction, used in the process of calculation of the three-dimensional texture value, in looking up the two-dimensional surface image texture, and in calculating the glow coordinate of the polygon visible at that viewpoint pixel location.

Multi-colored encoding, employed by the invention, provides increased precision of intermediate data. In the process of using texture maps to encode positional information limitations of the hardware processing architecture can be encountered. Typically 8 bits per "color" is the design parameter of the graphics display adapter. Additional encoding information can be supplied by utilizing all three colors in a quadrature encoding algorithm to increase the precision of the returned positional information.

This process consists of a multi-pass algorithm to obtain (for example) first the u coordinates and then the v coordinates. The w coordinates are obtained by subtraction.

The process consists of the steps of: establishing view parameters; placing a coded "texture" in the texture memory (step 66); placing the polygon in the display space; "displaying" the view; and reading (step 68) the resulting "image" which consists of coarse barycentric coordinates and quadrature phase encoded values for additional precision.

The coarse barycentric coordinates are then combined with a simple logic structure and applied to the quadrature phase encoded values for additional precision. Intermediate processed image data are now available for the application of photo-realistic rendering algorithms (step 70) such as shading, texturing, and shadowing, as discussed above.

Figure 7:
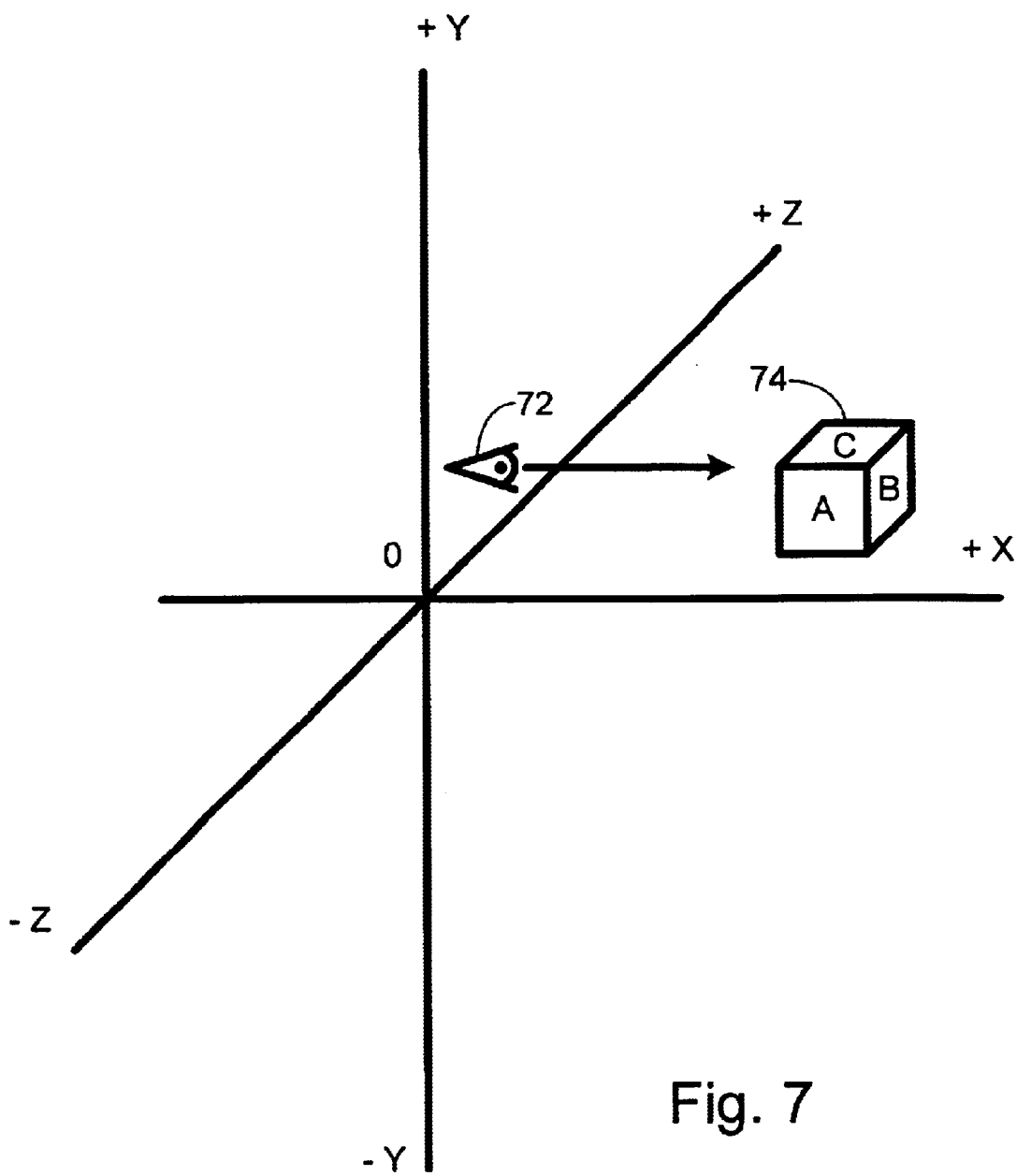
FIG. 7 shows an eye looking towards a three-dimensional cube.

FIG. 7 shows an eye looking towards a three-dimensional cube, and illustrates a situation in which a preferred embodiment may take a three-dimensional problem, such as ray tracing (discussed hereinabove) the cube with respect to that eye location, and partially converts the ray tracing problem into a two-dimensional problem, such as Z buffer sorting (discussed hereinabove), so as to allow a two-dimensional accelerator to speed up portions of the more complex three-dimensional ray tracing problem.

The cube is one object of perhaps many in an object space, where the object space has defined within it all of the objects, light sources, etc., that are to be rendered to an output (display, film, etc.). Each object has associated characteristics such as color, texture, reflectivity, opacity. For a given eye location 72, what the eye "sees" of the cube 74 is sections of sides A, C, and D (the side facing the eye but not visible to us), but side B is not visible to the eye. So, if we were to ray trace the cube with respect to the eye's indicated location, ray tracing algorithms will either waste computing resources to trace the B surface, only to then replace the computed data with different data corresponding to the nearest (to the eye) visible surface, or the algorithm will employ some three-dimensional hidden-surface removal algorithm to first reduce the complexity of the ray-tracing problem. However, since the hidden-surface removal algorithm employs three-dimensional techniques, such techniques require substantial computation resources to calculate the removal problem.

To reduce the complexity of the three-dimensional calculations, a preferred embodiment implements all or parts of a given three-dimensional rendering problem as one or more two-dimensional operations, where the processing of the two dimensional operations are performed with fast two-dimensional graphics accelerators. In the present example, the ray trace problem is broken into two parts, the first being a Z buffer sorting problem, a common procedure provided by two-dimensional accelerators. For each polygon comprising the sides of the cube, the polygons are rendered to memory (i.e. rendered but not made visible to the display output) with the two-dimensional accelerator. The resultant two-dimensional image contains only those pixels visible from the given eye location 72. By virtue of having rendered this scene, it is now possible to easily identify the visible portions of all objects with respect to the defined viewing eye location. In one embodiment, the identification is performed by temporarily assigning a pseudo-color to each object (or polygon used to form the object), before passing the scene data to the graphics accelerator. The colors in the resultant image indicate to which object each image pixel belongs. Thus, computing may then continue on with the three-dimensional ray tracing algorithm, where rays are only fired and computed for the pixels shown to be visible from the two-dimensional rendering process. In this fashion, a tremendous amount of computing has been avoided since the ray tracing did not process rays for the hidden portions of the cube's 74 polygons.

Similarly, for shadow processing during ray tracing, a preferred embodiment may utilize the stencil buffer to indicate whether a given pixel is in shadow from a given light source. If the pixel is in shadow, then the ray tracer does not need to go back to that light source (although it may have to return a ray to a different light source).

Figure 8:
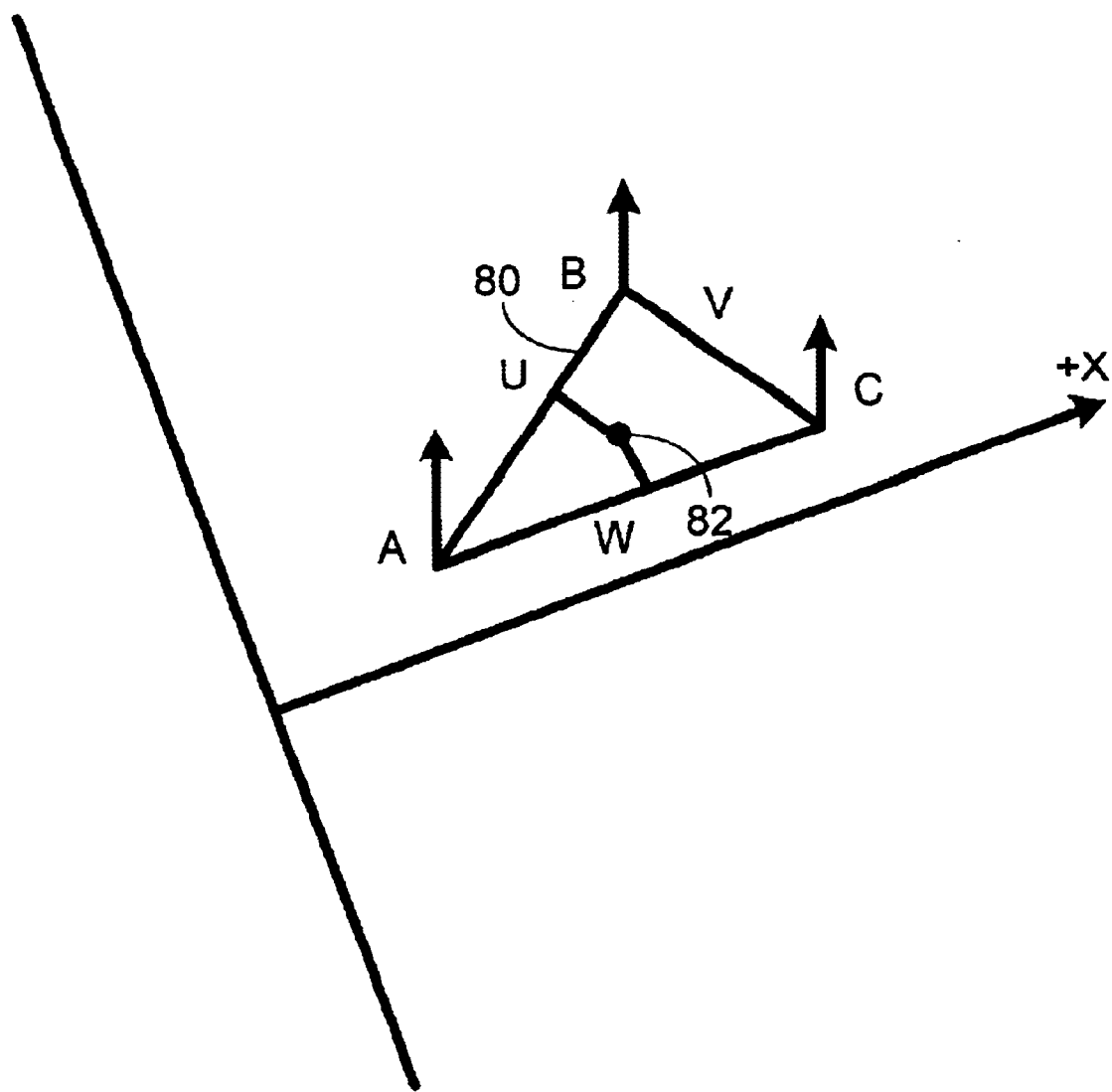
FIG. 8 shows a triangle for which the normal of an interior pixel is sought.

FIG. 8 shows a triangle 80 for which the normal of an interior pixel 82 is sought, so as to allow the application of Phong shading to the triangle. As with the ray trace example, calculations for a given three-dimensional object may be greatly minimized through use of the two-dimensional accelerator rendering technique to identify visible polygon portions for a particular eye location. As noted hereinabove, OpenGL does not provide an operation for performing Phong shading, because Phong shading requires that a normal be calculated for every pixel to which the shading is to be applied. In OpenGL, for a given surface, the surface is composed of a series of triangles that approximate the shape of the surface. (For a curved surface, it is assumed that the surface is sufficiently tesselated so that the human eye is unable to distinguish the triangle mesh from a surface having the true curvature.) OpenGL does not provide for obtaining a normal for each of the pixels within each triangle, so a preferred embodiment compensates for this as follows. First, barycentric coordinates are used to represent the coordinates of the vertices for each pixel within a given triangle. Then, a pre-determined function is utilized to encode the Barycentric coordinates as color values and these color values are assigned to the vertices and used to set the color along the edge of the triangle. (The particular conversion function is not important, so long as the barycentric values are reversibly uniquely encoded into color values.) The set color function results in a color spectrum, along one edge, that ranges in value between the two color values assigned to the vertices forming a given edge segment. Through encoding the barycentric coordinates as colors, and assigning them along the triangle edge in this fashion, it is now possible to obtain the normal for any pixel interior to the triangle. In a preferred embodiment, different colors are used to encode the different edge segments of the triangle. Alternatively, different colors may be assigned to each of the X, Y, and Z axes, and then the segment vertices assigned a color corresponding to its location with respect to the origin for the three axes. These color assignments allow the determination of the barycentric coordinates for any interior pixel. For example, assume that a first edge segment lies on the X axis. The pixel color for any pixel along the X axis segment may now be used to determine the pixel's distance along the X axis. A similar computation may also be performed for a second edge segment for the triangle. Any interior pixel location may be determined from the combination of the first and second segments. That is, if a perpendicular line is drawn from a first pixel along the first edge segment towards the interior of the triangle, and a second perpendicular line is drawn from a second pixel along the second edge segment, the barycentric coordinates for the point identified by where the two lines intersect may be calculated from the barycentric coordinates for the first and second pixels. Once the barycentric coordinates are known, then it is relatively simple to calculate the normal for that point. With the normal for that pixel point, it is now possible to apply Phong shading. (This technique also applies to bump map processing.) Such processing is in stark contrast to OpenGL, for OpenGL only provides normals for the vertices of the triangle, and a normal for an interior point computed as the average of the three defining vertices. The problem with this simplistic approach is that for curved surfaces, yielding a curved triangle, the center normal value is wrong. A preferred embodiment therefore allows for much more detailed and realistic representations.

More information regarding the use of barycentric coordinates may be found in *Curves and Surfaces for Computer Aided Geometric Design, A Practical Guide,* 2d Ed., by Gerald Farin (1990); this publication is hereby incorporated herein by reference. In one preferred embodiment, for a triangle having vertices A, B, and C, every texture normal within the triangle is a weighted sum of A, B, and C. And, each of the barycentric coordinates u, v, w are assigned to each of the three sides of a triangle, where u+v+w=1.0. Further, in alternate embodiments, the processing of barycentric coordinates may be performed in hardware or software, as neither processing format affects the intrinsic nature of the invention.

What is claimed is:

1. A process employing intermediate processed image data for photo-realistic rendering of a set of polygons, said process, comprising the steps of:

establishing view parameters;

replacing actual color values of each of said polygons with a unique respective polygon identifier;

rendering said polygons for a first time, to produce pixels consisting of coded polygon identifiers;

determining intermediate processed image data for each said polygon by applying said coded polygon identifiers to each said polygons;

calculating at least one additional parameter using said intermediate processed image data; and rendering said polygons for a second time by applying intermediate processed image data and said at least one additional parameter.

2. The process of claim 1, wherein said intermediate processed image data comprising linear interpolated coordinates.

3. The process of claim 1, wherein the step of calculating at least one additional parameter further comprises the step of calculating the direction of normal vectors.

4. The process of claim 1, wherein the step of calculating at least one additional parameter further comprises the step of calculating three-dimensional texture coordinates.

5. The process of claim 1, wherein the step of calculating at least one additional parameter further comprises the step of calculating world coordinates of each pixel in an output image.

* * * * *